UNITED STATES PATENT OFFICE.

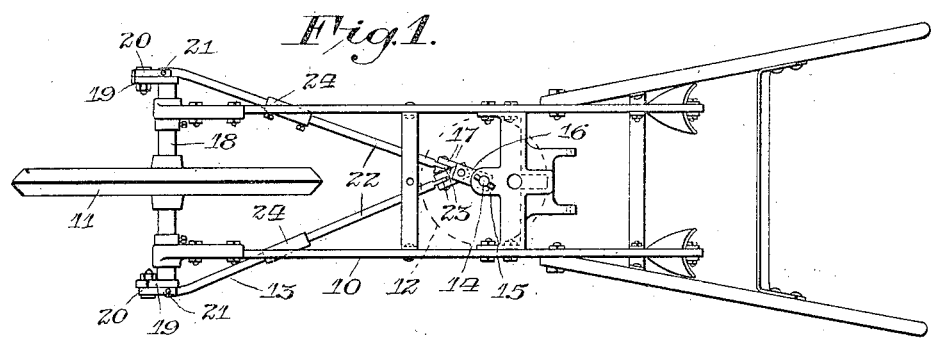
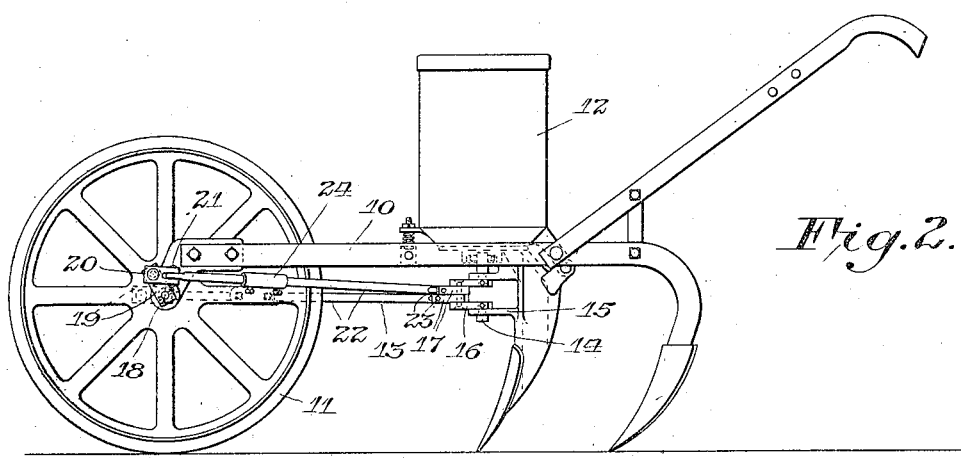
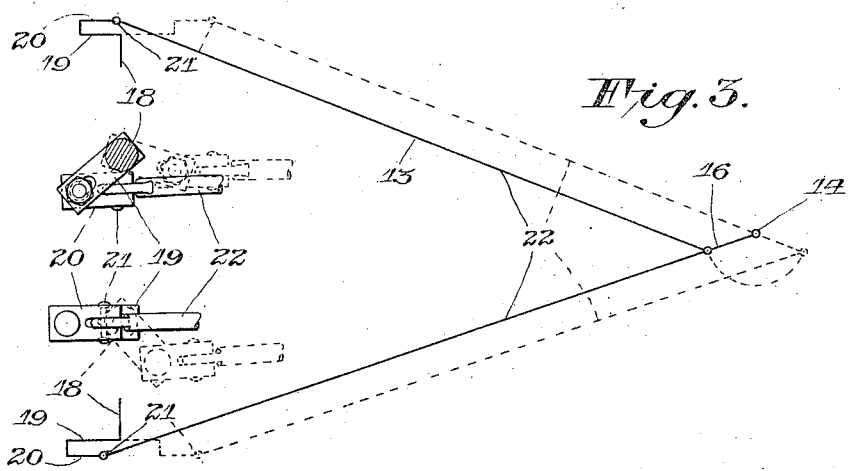

ALEXUS C. LINDGREN, OF MOLINE, ILLINOIS, ASSIGNOR TO INTERNATIONAL HARVESTER CORPORATION, A CORPORATION OF NEW JERSEY.

GEARLESS DRIVE.

1,237,666.  Specification of Letters Patent.  Patented Aug. 21, 1917.

Application filed July 2, 1914. Serial No. 848,535.

*To all whom it may concern:*

Be it known that I, ALEXUS C. LINDGREN, a citizen of the United States, residing at Moline, in the county of Rock Island and State of Illinois, have invented certain new and useful Improvements in Gearless Drives, of which the following is a full, clear, and exact specification.

My invention relates to a gearless drive for seed planters, and has for its object to improve and simplify the construction and operation of such a device.

This object I accomplish by the employment of a crank shaft drive in which the connecting rods are attached to a single crank arm on the driven member.

One form which my invention may assume is exemplified in the following description and illustrated in the accompanying drawings, in which—

Figure 1 shows the plan view of a seed planter embodying my invention;

Fig. 2 shows a side elevation of the same; and

Fig. 3 illustrates in diagram the operation of my improved drive.

Referring to the particular embodiment shown in the drawing it will be seen that my invention comprises a planter frame 10, a ground wheel 11, seed hopper 12, and driving mechanism 13. The hopper has seed dropping mechanism, (not shown), which is actuated by an upright shaft 14 journaled in a bracket 15. This shaft 14 is provided with a single crank arm 16 to which are loosely journaled two links 17. The ground wheel 11 is provided with an extended axle 18, which supports the forward end of the frame 10, and at its outer ends is provided with crank arms 19, said crank arms being spaced in an angular relation of about forty-five degrees. Upon each of these crank arms 19 is journaled in a freely rotatable manner a link 20 similar to the links 17. To each of these links 20 is hinged by means of a pin 21 a connecting rod 22, the two rods converging and having hinged connections 23 with the link 17. An adjustable coupler 24 is preferably arranged on each of the rods 22 to provide for the proper and necessary adjustment of the parts.

The operation of my device is best shown in Fig. 3, where it will be noted that due to the wide distance in a horizontal plane between the driving ends of the connecting rods a dead center on the driven ends is impossible. As shown in diagram by the solid lines the left hand connecting rod is on a dead point, but the right hand rod is some twenty-two and one-half degrees removed from that position, and in the dotted lines in Fig. 3 where the right hand rod is shown on dead center the other rod is removed a corresponding distance from such a center. On the driving ends of these ends the angled crank arms overcome the lined centers.

It is believed that this method of connecting two crank shafts is broadly new, and it has the advantage of simplicity and directness. For use in seed planters this form of drive is particularly adaptable inasmuch as gears may be dispensed with throughout the entire device, thereby decreasing the cost of construction, and materially lessening the likelihood of breakage and disarrangement.

While I have shown and described but one form and embodiment of my invention it is to be understood nevertheless that it is capable of other applications and modifications, and therefore many changes in the form of construction and uses to which it may be put may be made without departing from the spirit of my invention as disclosed in the appended claims.

What I claim and desire to secure Letters Patent of the United States on is:

1. In combination, a frame, an axle journaled in bearings carried by the front end of said frame, a carrying wheel mounted upon said axle, crank arms secured to opposite ends of said axle at varying angles, a vertically disposed shaft rotatably mounted upon the rear end of said frame in substantially a central longitudinal line relative to said crank arms, a single crank arm on said shaft, and connecting rods operatively coupling said axle crank arms with the single crank arm on said vertical shaft.

2. In combination, a frame, an axle journaled in bearings carried by the front end of said frame, a carrying wheel mounted centrally upon said axle, crank arms secured to opposite ends of said axle at varying angles, a vertically disposed shaft rotatably mounted upon the rear end of said frame in substantial alinement with the tread of said carrying wheel, a single crank arm on said shaft, separate links journaled upon said single crank arm, and connecting rods having their front ends operatively connected with said axle crank arms and their rear ends flexibly connected with said links.

3. In combination, a frame, an axle journaled in bearings carried by the front end of said frame, a carrying wheel mounted centrally upon said axle, crank arms secured to opposite ends of said axle at varying angles, links having one end thereof journaled upon said crank arms, a vertically disposed shaft rotatably mounted upon the rear end of said frame in substantial alinement with the tread of said wheel, a single crank arm on said shaft, separate links journaled upon said single crank arm, and connecting rods having their front ends pivotally connected with the opposite ends of said links journaled upon the crank arms of said axle and their rear ends pivotally connected with the links journaled upon said single crank arm.

In testimony whereof I affix my signature, in the presence of two witnesses.

ALEXUS C. LINDGREN.

Witnesses:
W. W. LOFTUS,
H. L. LOCKERT.

Copies of this patent may be obtained for five cents each, by addressing the "Commissioner of Patents, Washington, D. C."